United States Patent Office 3,038,002
Patented June 5, 1962

3,038,002
SYNTHESES OF α-METHOXYPHENYLACETATES
Edward Wilkins Reeve, College Park, Md., assignor to Fundamental Research, Inc., Wilmington, Del., a corporation of Delaware
No Drawing. Filed Aug. 19, 1957, Ser. No. 679,108
11 Claims. (Cl. 260—473)

This invention relates to the preparation of new compositions of matter and their use in chemical, agricultural and other fields.

In the analytical field of chemistry there are available tests for the sodium ion, but there is need for tests, both qualitative and quantitative, that are more sensitive and more accurate. There is also a definite need for methods that are simpler and that are less subject to interference by other ions than the methods now available. Such tests are described in my application Serial No. 599,671, filed July 16, 1956 of which this present application is a continuation-in-part.

In the agricultural field, certain phenoxyacetic acids, such as 2,4-dichlorophenoxyacetic acid, are known to have physiological activity in plants, being plant growth stimulants, weed-killers, herbicides and the like. Compounds of greater activity or affording different effects are desired.

There is also considerable interest in the pharmaceutical field in penicillin-type compounds. As is known, phenylacetic acid is used in penicillin preparation. Other compounds affording new derivatives having different or more difficult metabolization are being sought. Further, economical routes to these various agents are of considerable interest to industry.

An object of this invention is the provision of new methods for making these compositions of matter. A still further object is the provision of new methods for making compositions of matter in simple, stable form for use as analytical reagents. Another object is the provision of new methods for making compositions of matter that have physiological activity. Still another objective is the provision of methods for making the compositions from readily available, low-cost starting materials. Other objects will appear hereinafter.

The objects of this invention are accomplished by the preparation of certain alpha-alkoxyarylacetic acid compounds. Such compounds may be the free acids themselves, fully neutralized salts thereof, half-acid salts thereof, esters and other derivatives of the acids. Further, the phenyl group may bear substituents, such as halogen atoms. The compounds of this invention are exemplified by the formula

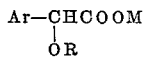

wherein Ar represents an aryl group such as phenyl ($C_6H_5$) or a substituted phenyl group or naphthyl, indolyl, pyridyl and similar groups, and M represents a metal from such compounds as potassium hydroxide or M represents a nitrogen-containing radical from a salt-forming material such as ammonia, an amine or a quaternary ammonium hydroxide or M is a hydrogen atom or a carbon-containing ester group, and R represents the radical stemming from the alcohol component, being methyl, n-butyl or similar groups. These compounds are useful in these various forms as analytical reagents, in the agricultural field, or in the pharmaceutical field, as in penicillins. The compounds of this invention are readily prepared by the processes of this invention comprising, for example, treating the corresponding aryl aldehydes with chloroform, a base and an ether-forming component to form the corresponding ether-esters which may be used as such or converted to other materials, as, for example, by hydrolysis to the acids, formation of salts from the acids and similar conversions.

The invention thus is a direct or one-step process for the preparation of alpha-alkoxyarylacetic acid compounds. Arylaldehydes are reacted with haloforms in the presence of a base and an etherifying agent such as sodium methylate or methyl alcohol. The product resulting depends on the conditions involved and the process can be directed to obtain as the alpha-alkoxyarylacetic acid compound the free acid itself, a salt thereof, an acid-salt thereof or an ester thereof, for example. New compositions of matter of considerable interest in various fields are made readily available by economic routes.

This invention will be further understood by reference to the following examples which are given for illustrative purposes only and are not limitative.

Example 1

$C_6H_5CHO + CHCl_3(NaOCH_3) \longrightarrow C_6H_5-CHOH-CCl_3$
$C_6H_5-CHOH-CCl_3 + NaOCH_3 \longrightarrow$

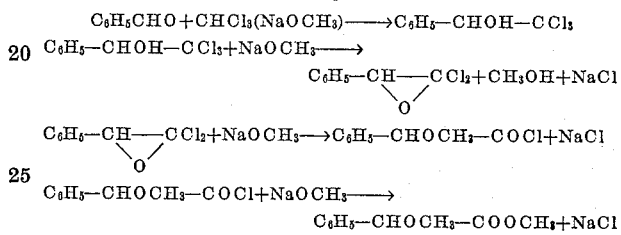

$C_6H_5-CHOCH_3-COCl + NaOCH_3 \longrightarrow$
$C_6H_5-CHOCH_3-COOCH_3 + NaCl$

To 3 l. of dry methanol in a 5 l. three-necked round-bottomed flask equipped with a stirrer and reflux condenser and sitting in an appropriate vessel was added 230 g. (10 moles) of metallic sodium sticks over a 40-minute period. After refluxing started, the vessel was filled with ice and water, and the ice-water mixture was continually poured over the top of the flask to help condense the methanol vapors. After 90% of the sodium dissolved, the ice and water mixture was removed so that the reaction mixture remained hot while the last of the sodium dissolved, and the stirrer was started at this time to assist in the dissolving.

A 5 l. three-necked flask was equipped with a stirrer, thermometer, dropping funnel, and condenser and was placed in a water bath. In the flask were placed 310 ml. (3 moles) of benzaldehyde, 318 ml. (4 moles) of chloroform, and 250 ml. of methanol. Stirring was started, and the prepared sodium methoxide solution was run in over a 90 minute eperiod. Enough heat was evolved to raise the temperature to 40° C within 25 minutes. It was easily maintained at 39° C. to 41° C. by adding cold water as necessary to the water bath.

The methyl ester formed by the above process may be isolated readily from the reaction mixture by saturating the reaction mixture with carbon dioxide to destroy the excess sodium methoxide, filtering the precipitated sodium acid carbonate and sodium chloride and distilling the residual liquid. When prepared, it is a colorless liquid having a boiling point of 96°–97° C. at 6 mm.

If the acid or a salt is desired, the reaction mixture is used as obtained, the ester being generally hydrolyzed completely and the sodium acid salt

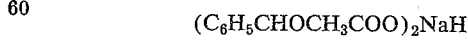

being obtained as a precipitate by acidifying the hydrolysis mixture or its equivalent to a pH of about 3, as follows:

To the above ester mixture is added 6 moles of sodium hydroxide as a 25% solution. The resultant mixture warms up to 70° C. and refluxes rapidly. A liter of room temperature tap water is then added to the reaction mixture and then about 500 ml. of 1:1 hydrochloric acid is added to a pH of 3.3 The pH at which the acid salt has a minimum solubility is 3.13 in pure water; it is about 3.3 in the methanol-water-sodium chloride solution. After stirring at room temperature for an hour, or standing overnight, the sodium acid salt of alpha-methoxyphenylacetic acid is filtered and washed on the filter with a little methanol. The damp weight is 500 g. to 1,000 g. depending on how much sodium chloride is present. The filter cake is transferred to a beaker, mixed with three times its damp weight of tap water, and mechanically stirred for one half hour. It is then filtered and washed with 50–100 ml. of cold tap water. The weight after air drying is 190 g.

The free acid may be obtained as follows:

$(C_6H_5-CHOCH_3-COO)_2NaH+NaOH \rightarrow$
$\qquad 2C_6H_5-CHOCH_3-COONa+HOH$
$2C_6H_5-CHOCH_3-COONa+H_2SO_4 \rightarrow$
$\qquad 2C_6H_5-CHOCH_3-COOH+Na_2SO_4$ In a 5 l. round bottomed flask are placed 531 g. (1.5 moles) of the sodium acid-salt, purified or crude, 4.5 l. of hot water and sufficient concentrated sodium hydroxide solution (about 75 ml.) to make the resultant mixture alkaline to phenolphthalein which can be added as an internal indicator. The flask is heated on a steam bath to 70° C. at which point practically all of the material dissolves. Sodium sulfide or other suitable precipitating agents can be added to remove impurities such as iron. If the purified acid salt is used, the sulfide treatment may be omitted. The solution is filtered into a 12 l. flask, and the 5 l. flask and precipitate are washed with 100 ml. hot water. To the clear, pink filtrate, which is at 55° C. and shows no immediate tendency to crystallize, is added all at once 400 ml. of warm dilute sulfuric acid prepared by adding 100 ml. conc. sulfuric acid to 300 ml. water and allowing to cool somewhat. The mixture is swirled to mix thoroughly. On standing, 293 g. of liquid acid separates and is removed. The aqueous solution is extracted four times with 300 ml. of benzene each time. The layers separate readily after 10–15 min., even with vigorous shaking. The liquid, wet acid, which shows no tendency to crystallize, and the benzene extracts are combined and washed four or five times with 100 ml. distilled water each time until the aqueous wash gives no test with a 0.5 M barium chloride solution. The first washing can be vigorous and the layers will separate quickly. After that, the two liquid layers must be simply swirled together or an emulsion will form which takes hours to break. The last washing can be vigorous if it is allowed to stand overnight to separate the layers. Each 100 ml. water wash contains about 3 g. of the acid. The water washes can be saved and recycled.

The wet benzene solution of the acid is placed in a 2 l. flask and the benzene distilled off until the residual liquid weighs about 800 g. The distillation starts at 69° C. and raises to 81° C. at which time the solution contains only a little water even though the benzene is still coming over cloudy. The hot benzene solution is filtered through a filter into a weighed 2 l. beaker and the flask and filter paper washed with sufficient benzene to make the total weight of the contained material 900 g.

The beaker is placed in an ice bath, and the contents are cooled to 5° C. and maintained at this temperature or somewhat lower for half an hour. The mixture is stirred occasionally and the solid acid which freezes on the sides is scraped off. The mixture is filtered, the solid matter obtained is pressed as dry as possible on the filter, the suction is released and 100 ml. of benzene cooled to 6° C. is allowed to soak through the filter cake. The cake is sucked dry again, and the process is repeated with 100 ml. of cyclohexane cooled to 6° C. The cyclohexane wash is kept separate from the benzene fractions. It can be evaporated to recover the acid it contains. The filter cake is sucked dry until all traces of liquid coming through have ceased. It can then be air dried or dried in a vacuum oven at 50° C. after a preliminary air drying. The yield is 350 g. out of a theoretical 498 g.

While the various reactions have been described in detail and intermediates have been shown, it is emphasized that the process of this invention above and herein is a one-step process. The acid compound is derived directly be it an acid salt, a salt, an ester, or the free acid. However, since the crude free acids are often troublesome to purify, the pure free acids are usually obtained from one of the salts of the acid as in the example.

*Example II*

In an initial experiment, 3,4-dichloro-alpha-methoxyphenylacetic acid was prepared from 3,4-dichlorobenzaldehyde by converting the aldehyde to the mandelonitrile, methylating and then hydrolyzing. From 31 g. of 3,4-dichlorobenzaldehyde was obtained the 3,4-dichloromandelonitrile as an oil which was hydrolyzed with 250 ml. concentrated hydrochloric acid in a flask at steam bath temperature for ten hours with mechanical stirring. After evaporating the hydrochloric acid, the residual oil was treated with excess sodium bicarbonate solution, and this solution was then acidified and extracted with ether. On evaporating the ether there was obtained 29 g. of the 3,4-dichloromandelic acid as an oil. This was methylated with dimethyl sulfate; the crude sodium 3,4-dichloro-alpha-methoxyphenylacetate was insoluble in the reaction mixture and was filtered off. This was converted to the crude acid with 6 N hydrochloric acid. The crude acid was purified by converting it into its sodium salt again, and treating a 0.5 M solution of this with an equal volume of 20% sodium hydroxide solution. The precipitated sodium salt of the methoxy acid was filtered off, dissolved in water, and the water solution acidified with 6 N hydrochloric acid and extracted with ether. Ten grams of the 3,4-dichloro-alpha-methoxyphenylacetic acid was obtained as an oil. After being crystallized from 400 ml. of 60–80° C. petroleum ether, the material (7 g.) melted at 89° C. It analyzed correctly for $C_9H_8Cl_2O_3$.

This acid could be demonstrated to form a sodium acid salt by titrating a 5% solution in isopropyl alcohol with 0.5 N aqueous sodium hydroxide solution to the phenolphthalein end-point and then back titrating half way with 0.5 N hydrochloric acid. After standing ten minutes, and scratching the walls of the flask with a stirring rod, crystals of the sodium acid salt began to precipitate.

The cumbersome multi-step, low-yielding process is made obsolete by the process of this invention:

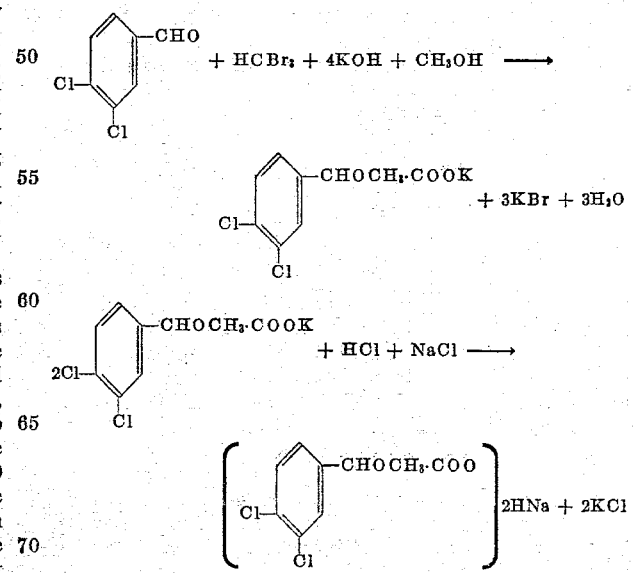

A 1-liter 3-necked flask is fitted with a mechanical stirrer, a thermometer and a dropping funnel. The latter two should be suspended from outside supports so that the two side necks of the flask remain open. The flask is charged with 87 g. (0.5 mole) of 3,4-dichlorobenzaldehyde, 58 ml. (0.67 mole) of bromoform, and 50 ml. of methanol. In another flask, 150 g. (2.5 moles) of pellet potassium hydroxide is dissolved in 400 ml. of methanol with cooling, and this solution is slowly added to the materials in the three-necked flask over a period of two hours. The temperature is maintained at about 15° C. by means of an ice bath. After the addition is complete, the mixture is stirred for an additional five hours while the ice bath warms up to room temperature. The reaction mixture is allowed to stand overnight.

To the reaction mixture is added 150 ml. of water and sufficient 6 N hydrochloric acid (approximately 80 ml.) so that a sample of the mixture, when diluted with four parts of water, has a pH of 3.2. The mixture is then poured into 500 ml. of an aqueous solution of 50% saturated sodium chloride and the mixture stirred overnight. The next morning lumps of the sodium acid salt are present. The water is decanted off, and then the lumps thoroughly masticated with 150 ml. of acetone. The mixture is then allowed to stand a day or two, and is then filtered. The weight at this point is 65 g. After another extraction with 75 ml. of acetone, and two stirrings with 200 ml. of water for an hour each time, 57 g. (46% of theory) is obtained. Anal., Calcd. for $C_{18}H_{15}O_6Cl_4Na$: —$OCH_3$, 12.61; neutral equiv., 492. Found: —$OCH_3$, 12.99; 12.97; neutral equiv., 490.

If chloroform is used instead of bromoform, the reaction is carried out at 40° C. and the final yield is 22 g. (18% of theory). Accordingly, bromoform is preferred.

The material can be converted to the true sodium salt by treatment with sodium hydroxide solution, and this is readily convetred to the free acid.

*Example III*

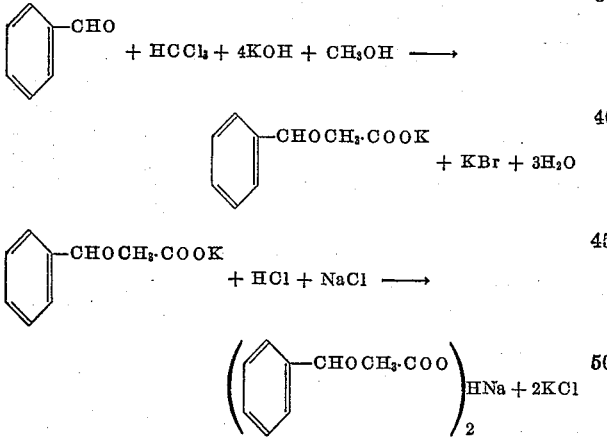

A 1-liter 3-necked flask is fitted with a mechanical stirrer and the flask so mounted that a cooling bath can be applied and the bath can be warmed on a steam bath. A thermometer and an addition funnel are supported externally so that they do not plug the two side necks. No reflux condenser is necessary. The flask is charged with 52 ml. (0.5 mole if 100%) of the crude benzaldehyde, 53 ml. (0.67 mole) chloroform, and 50 ml. of methanol. The materials are stock chemicals and are used without purification. The stirrer is started and a solution of 78 g. (1.25 mole) technical flake 90% potassium hydroxide in 200 ml. of stockroom methanol is added over a half hour period. The reaction is exothermic and will get completely out of control if the temperature gets in the upper fifties. The temperature should be maintained at 39–41° C. by means of the ice bath. Another 78 g. portion of potassium hydroxide is added over a half hour period. This may be dissolved in methanol or it may be used as solid flake if it is desired to keep the volume of the reaction mixture down. The mixture is stirred at 40° C. for three or four hours, and allowed to stand overnight at this temperature.

The next day, 150 ml. of water is added, and then sufficient 6 N hydrochloric acid (approximately 65 ml.) to acidify the mixture so that a sample when diluted with four parts of water has a pH of 3.2. The reaction mixture is poured into an equal volume of a 50% saturated sodium chloride solution, and the mixture stirred for an hour.

The mixture is filtered and the filter cake on the filter treated with 100 ml. of acetone. After the acetone has thoroughly penetrated the filter cake, suction is again applied. The dry weight at this point is 195 g. The material is stirred with 450 ml. of water in a beaker for half an hour and filtered. Preferably two such treatments are given. Forty one grams is obtained (46% of the theoretical value). Anal., Calcd. for $C_{18}H_{19}O_6Na$: —$OCH_3$, 17.52; neut. equiv., 354. Found: —$OCH_3$, 17.68; neut. equiv., 382 (equal to 93% purity). It melted at 229–230° C. Theory 237–238° C.

The material can be further purified as by applying another acetone treatment. The yield is probably in excess of 50% because the benzaldehyde is crude. While the reaction can be run with bromoform at 0 to 10° C., the yield is still only about 50% so that this method with chloroform affords attractive economies.

*Example IV*

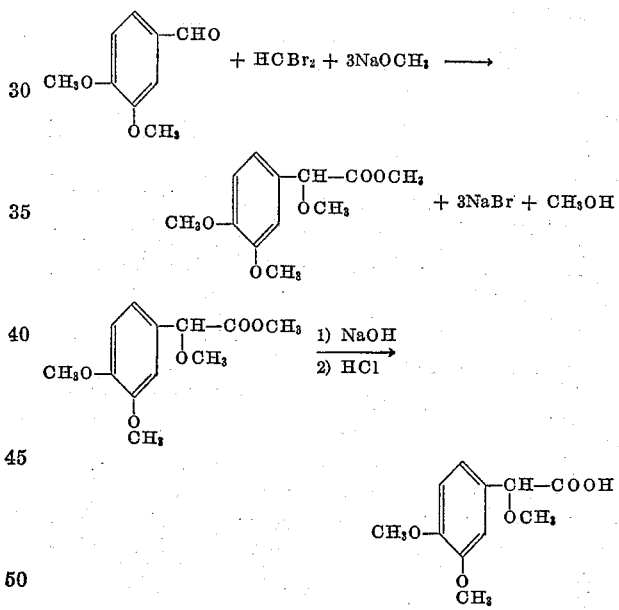

A five hundred milliliter, three-necked flask was equipped with a mechanical stirrer, thermometer, and dropping funnel. The flask was placed in an ice bath and 24 g. of 3,4-dimethoxybenzaldehyde (0.145 mole), 55 g. of bromoform (0.218 mole—contained 10% methanol), and 30 ml. of dry methanol introduced. A solution of 15 g. of sodium (0.653 mole) in 200 ml. of dry methanol was placed in the addition funnel and added to the stirred reaction mixture over a three hour period. After about two thirds of the sodium methoxide solution had been added, the reaction mixture became quite thick and it was necessary to add 50 ml. of dry methanol. The temperature was kept at 3° C. during the addition of the sodium methoxide and for one hour afterward. The ice in the bath was allowed to melt and the temperature slowly rose to 21° C. in three hours. Thirty-five milliliters of 20% sodium hydroxide solution was added and the mixture allowed to stand overnight.

Most of the methanol was removed from the reaction mixture by distillation. The residue was acidified with 3 N hydrochloric acid and the oil which separated removed by extraction with ether. The ether layer was extracted with 100 ml. of 10% sodium hydroxide solution, the layers separated, and the aqueous layer acidified and extracted with ether. The layers were separated and the ether removed from the ether phase by evaporation on the steam bath to give 17.2 g. of oil which could not be made to crystallize. This oil was half neutralized with 7.6 ml. of 20% sodium hydroxide solution to produce a solid sodium acid salt. This was washed with acetone and recrystallized from 300 ml. of absolute ethanol. The yield was 6.5 g. (19% of theory) of white material melting at 190.5–193.5° C.

The free acid was obtained by dissolving 3.5 g. of the acid salt in 25 ml. of water, acidifying, and extracting with ether. The ether layer was dried with magnesium sulfate and the ether removed by evaporation on the steam bath. The resulting oil crystallized upon cooling and scratching. Crystallization from di-n-butyl ether gave 2.5 g. of large colorless crystals melting at 96.0–97.5° C.

Example V

The following table summarizes the results of various reactions used for the preparation of the sodium acid salt of some alpha-methoxyarylacetic acids:

PERCENT YIELD OF THE ACID SALT

| Aldehyde | Haloform | $CH_3ONa$ | NaOH | KOH |
|---|---|---|---|---|
| Benzaldehyde | $CHCl_3$ | 35–40 | 30 | 45 |
|  | $CHBr_3$ |  |  | 50 |
| 3,4-Dichlorobenzaldehyde | $CHCl_3$ |  |  | 18 |
|  | $CHBr_3$ |  |  | 48 |
| 3,4-Dimethoxybenzaldehyde | $CHBr_3$ | 19 |  |  |
| 3,4-Diethoxybenzaldehyde | $CHBr_3$ | 24 |  |  |
| p-Isopropylbenzaldehyde | $CHCl_3$ | 32 |  |  |
| 2,3-Dimethoxybenzaldehyde | $CHCl_3$ | 28 |  |  |
| o-Methoxybenzaldehyde | $CHCl_3$ | 19 |  |  |
| o-Ethoxybenzaldehyde | $CHCl_3$ | 32 |  |  |

From this table it can be seen that the particular choice of the base or haloform depends to some extent on the aldehyde being converted. The superiority of potassium hydroxide over sodium hydroxide is general and potassium hydroxide is preferred. Similarly, in some instances bromoform will be preferred over chloroform. Other haloforms may be used including the iodine and fluorine compounds and mixed haloforms such as $CHBrClF$. Other aldehydes, by way of example, include p-chlorobenzaldehyde, naphthaldehyde and heterocyclic aldehydes.

As can be seen, the alcohol is the alkoxy group is not limited to methoxy. Other alcohols can be used as the etherifying agent, including short or long chain compounds, for example, in addition to methyl and ethyl alcohols, n-propyl, n-butyl, n-amyl and n-hexyl alcohols or their various isomers. Long chain alcohols, such as dodecyl alcohol, can also be used and there may be other substituents in the alkoxy group as, for example, nitro and amino. As noted, the base and etherifying agent can be combined as one as an alkaline alkoxide, as, for example, is the case when sodium methoxide is used. Alkaline alkoxides may also be used in the presence of the alcohol, if desired. The acid compounds obtained by this invention can be used for the preparation of many other compounds such as salts, esters and amides.

The compounds that are prepared by the process of this invention are alpha-methoxyphenylacetic acid or similar acids such as the 3,4-dichloro-alpha-methoxyphenylacetic acids or derivatives thereof such as esters or salts of the acids with ammonia, amines, quaternary ammonium hydroxides or metals. These compounds are useful, as described in my application S.N. 599,671, filed July 16, 1956, in testing for sodium ion qualitatively or quantitatively.

The acids, unsubstituted or those bearing constituents on the phenyl group can be prepared by treating the corresponding arylaldehyde with a haloform, such as chloroform, in the presence of an alkaline methylating medium. This medium may be a solution of sodium methoxide, a mixture of sodium hydroxide and methyl alcohol, a mixture of potassium hydroxide and methyl alcohol, potassium methoxide or a mixture of potassium carbonate and methyl alcohol. Other basic compounds which may be used include lithium hydroxide and quaternary ammonium hydroxides. Addition of the haloform at the aldehyde group followed by the transformation of the hydroxyl first formed to a methoxyl group by way of hypothetical intermediates to form the carbomethoxy group leads to the desired esters. While the various methyl esters are useful, for example, in the treatment of plants, it is necessary to hydrolyze the ester to the free acid for use in the sodium testing processes referred to in this invention.

A number of bases may be used in the formation of useful salts. These include lithium carbonate, potassium carbonate and similar carbonates; sodium hydroxide, potassium hydroxide and similar bases; ammonia; amines, such as dimethylamine and trimethylamine; and quaternary ammonium hydroxides, such as tetramethylammonium hydroxide. As described in my above identified co-pending application, a mixture of trimethylamine and acetone is readily developed into an analytical reagent which is as good in sodium testing as the tetramethylammonium hydroxide reagent described in detail in the co-pending application.

The reagents for testing for sodium are superior to the currently used zinc uranyl acetate and the potassium antimonate reagents, and the methods involving them provide for the ready testing of sodium.

The physiological activities of the compounds of this invention are similar to 2,4-dichlorophenoxyacetic acid. The aryl group in the alpha-methoxyphenylacetic acid compound is an important component, for without it there is no activity on plants. The alpha-methoxy group increases water solubility. The metabolization in the plants of the compounds is different than that of the corresponding alpha-hydroxy acids in that the compounds of this invention are not metabolized as readily nor in the same way. Replacing the methoxy group with an ethoxy radical decreases activity, but placing chlorine constituents on the phenyl ring in the 2,4- and 3,4- positions leads to increased activity. The methyl esters are almost as active physiologically as the free acids themselves. The esters are useful in the commercialization of the compounds of this invention because of this activity and because this invention provides a very economical method for producing the methyl esters.

The processes of this invention afford a one-step route to highly desirable compounds. The necessity of isolating intermediates is avoided and much more economic routes are made available. The yield per unit reactor volume is about tripled over that of previous routes.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:

1. A direct one-step process for the preparation of an alkali metal salt of an alpha-alkoxyarylacetic acid which process comprises mixing, in the presence of an alkali metal hydroxide dissolved in a lower alkanol, an arylaldehyde with a haloform selected from the group consisting of chloroform and bromoform; and cooling the resultant mixture, keeping the temperature in degrees centigrade below the upper fifties, to control the resultant exothermic reaction to produce said salt.

2. A process in accordance with claim 1 in which said alkali metal hydroxide is potassium hydroxide.

3. A process in accordance with claim 1 in which said arylaldehyde is a benzaldehyde.

4. A direct, one-step process for the preparation of a compound selected from the group consisting of an alkyl ester of an alpha-alkoxyarylacetic acid which process comprises mixing, in the presence of an alkali metal alcoholate dissolved in a lower alkanol, an arylaldehyde with a haloform selected from the group consisting of chloroform and bromoform; and cooling the resultant mixture, keeping the temperature in degrees centigrade below the upper fifties, to control the resultant exothermic reaction to produce said ester.

5. A process in accordance with claim 4 in which said alcoholate is sodium methoxide.

6. A process in accordance with claim 4 in which said arylaldehyde is a benzaldehyde.

7. A process in accordance with claim 4 in which said alcoholate is sodium methoxide and said alcoholate is methanol.

8. A process for the preparation of a potassium alpha-methoxyarylacetate, said process being a direct, one-step process, which process comprises mixing an arylaldehyde with a haloform selected from the group consisting of chloroform and bromoform, said mixing being effected in the presence of potassium hydroxide dissolved in methanol; and cooling the resultant mixture, keeping the temperature in degrees centigrade below the upper fifties, to control the resultant exothermic reaction to produce a potassium salt of an alpha-methoxyarylacetic acid.

9. A process in accordance with claim 8 in which said aldehyde is benzaldehyde.

10. A process in accordance with claim 8 in which said aldehyde is 3,4-dichlorobenzaldehyde.

11. A process in accordance with claim 8 in which said haloform is chloroform.

References Cited in the file of this patent

Jocicz: Chem. Zentr., pages 1013–1014 (1897).
Savariau: Compt. rend., Tome 146, page 297 (1908).
Wagner et al.: Synthetic Organic Chemistry, pages 226–228 and 481 to 482 (1953).
Wagner et al.: Synthetic Organic Chemistry, page 233 (1953).